June 2, 1936. W. B. BROWN 2,042,766
GAS METER
Filed May 21, 1934
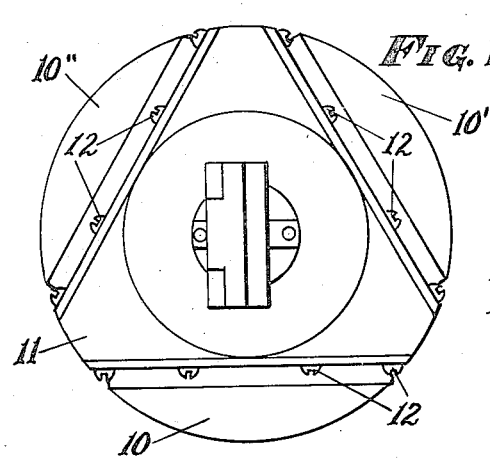
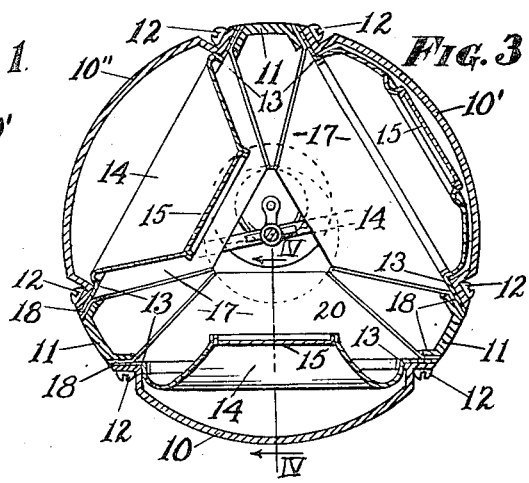
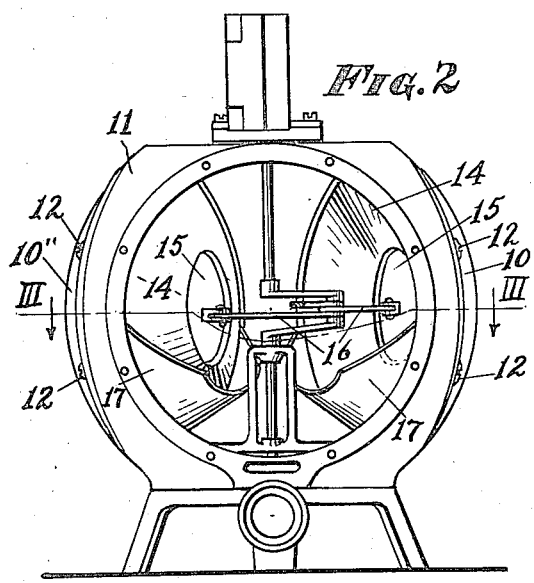
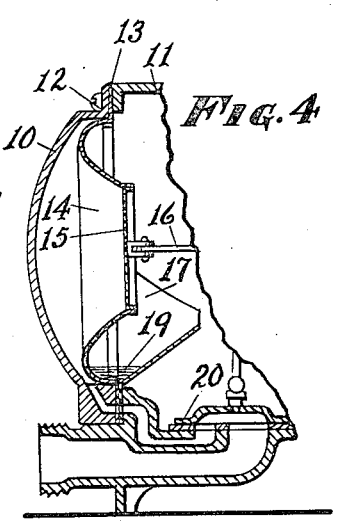
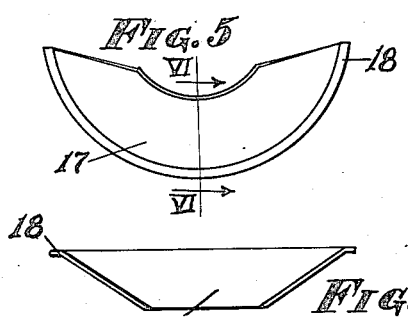
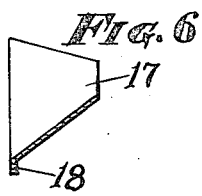
INVENTOR.
William B. Brown
BY
M. Y. Charles
ATTORNEY.

Patented June 2, 1936

2,042,766

UNITED STATES PATENT OFFICE 2,042,766

GAS METER

William B. Brown, Wichita, Kans.

Application May 21, 1934, Serial No. 726,638

2 Claims. (Cl. 73—263)

This invention relates to an improvement in gas meters and more particularly to a shield to form an oil cup for the diaphragms of the meter and also a protective element for the valve etc., positioned adjacent the diaphragms.

The object of my invention is to provide a shield that will divert the flow of gas coming into the meter so it will not strike against the flexible leather or sheep skin diaphragms so that the liquids, such as water and gasoline in the gas will not be deposited on the diaphragms and wash the oil and preservatives out of the diaphragms and render them in a condition that they can be easily broken or torn by their action as the meter runs.

Another object is to provide a shield which may be positioned adjacent the diaphragms in the meter to make a cup like formation between the shield and the diaphragm so that oil or preservative liquids may be held therein and the diaphragms are therefore constantly preserved by the oils or preservative liquids. It is obvious that this arrangement makes it possible to saturate the diaphragm with oil or preservative liquids at the time of assembly of the meter and such oil or preservative liquid as drains out of the diaphragm will be caught in the cup formation above described and by capillary attraction will eventually find its way back into the diaphragm, thereby causing the diaphragm to operate more freely which reduces the friction in the operation of the meter.

The shields may be applied to any meter, thereby improving the meter without building a new meter. These and other objects will be more fully explained as this description progresses.

Now referring to the drawing in which the same characters of reference refer to the same parts throughout the following descriptions.

Fig. 1 is a plan view of a gas meter containing three diaphragms. Fig. 2 is a front view of Fig. 1 having a front cheek cover 10 removed for convenience of illustration. Fig. 3 is a sectional view as seen from line III—III in Fig. 2. Fig. 4 is a sectional view as seen from line IV—IV in Fig. 3. Fig. 5 is a front view of the shield. Fig. 6 is a sectional view as seen from line VI—VI in Fig. 5. Fig. 7 is a plan view of Fig. 5.

In the drawing is shown a meter having a housing element 11, with cheek cover plates 10, 10' and 10" attached thereto by means of screws 12. Between each of the elements 10, 10' and 10" and the element 11 are ring like elements 13 each of which is provided with a diaphragm 14. Each diaphragm is provided with a center plate element 15 to which is connected connecting rods 16 which are actuated by the action of the meter to move the centers of the diaphragms inwardly and outwardly in a horizontal direction. The foregoing description applies to the conventional meter now in use and my improvement consists of the shield 17 one for each diaphragm, which is made as follows; each shield is preferably formed of a single piece of metal, although it may be formed of other materials. The material is formed in a sector shaped shield 17 having a flange 18 which is adapted to be received and rigidly held between the elements 11 and 10 and likewise the flange of another shield is held between the elements 11 and 10' and the flange of still another shield is held between the elements 11 and 10'', to make cup like formations between the shields 17 and the diaphragms 14 and in these cup shaped formations may be placed an oil 19 or any other desired liquid as previously mentioned.

It has been the practice to saturate the diaphragm with oil when assembling the meter, but this eventually drains out of the diaphragms and into the bottom of the meter and onto the valve arrangement 20 where it becomes gummy and causes the valve to stick or work hard which interferes with the accurate operation of the meter. It is obvious that by using my shield that this trouble cannot occur with the valve and the oil is retained in the diaphragm where it is intended to be and the trouble with the valve is eliminated.

Such modifications of my shield and the application of said shield to different designs of meters may be employed without departing from the spirit and intention of my invention. Now having fully described my invention, what I desire to secure by Letters Patent is;

1. In gas meters, diaphragms and a valve operable in said meter, said valve being positioned below said diaphragms, a sector shaped shield for each of said diaphragms, each shield being positioned intermediate its respective diaphragm and said valve, the combination of each shield and its respective diaphragm forming an open top reservoir for the retention of liquids against drainage to said valve.

2. In a gas meter; a diaphragm and a valve operable in said meter, said valve being arranged below said diaphragm, a sector shaped shield for said diaphragm positioned intermediate said diaphragm and said valve and constituting with said diaphragm a reservoir for the retention of liquids.

WILLIAM B. BROWN.